(12) United States Patent
Delair et al.

(10) Patent No.: US 7,624,858 B2
(45) Date of Patent: Dec. 1, 2009

(54) MODULAR PLASTIC CONVEYOR BELT FOR SPIRAL CONVERSION

(75) Inventors: Jeffrey Earl Delair, Leesport, PA (US); William J. Bickel, Jr., Midwest City, OK (US)

(73) Assignee: Habasit AG, Reinach-Basel (CH)

( * ) Notice: Subject to any disclaimer, the term of this patent is extended or adjusted under 35 U.S.C. 154(b) by 137 days.

(21) Appl. No.: 12/005,141

(22) Filed: Dec. 21, 2007

(65) Prior Publication Data

US 2009/0159407 A1 Jun. 25, 2009

(51) Int. Cl.
*B65G 21/18* (2006.01)
(52) U.S. Cl. .......................... 198/778; 198/850; 198/853
(58) Field of Classification Search .................. 198/778, 198/850, 851, 853
See application file for complete search history.

(56) References Cited

U.S. PATENT DOCUMENTS

| | | | | |
|---|---|---|---|---|
| 1,224,445 | A * | 5/1917 | Burpee | ........................ 198/853 |
| 4,103,768 | A | 8/1978 | Persson | |
| 4,901,844 | A | 2/1990 | Palmaer et al. | |
| 5,069,330 | A | 12/1991 | Palmaer et al. | |
| 5,310,045 | A | 5/1994 | Palmaer et al. | |
| 5,613,597 | A | 3/1997 | Palmaer et al. | |
| 5,706,934 | A | 1/1998 | Palmaer et al. | |
| 5,906,270 | A * | 5/1999 | Faulkner | ....................... 198/853 |
| 5,921,379 | A * | 7/1999 | Horton | ......................... 198/852 |
| 6,345,715 | B2 | 2/2002 | Palmaer | |
| 6,428,436 | B1 | 8/2002 | Woyach et al. | |
| 6,471,048 | B1 | 10/2002 | Thompson, Jr. et al. | |
| 6,484,379 | B2 | 11/2002 | Palmaer | |
| 6,523,680 | B2 * | 2/2003 | Guldenfels | .................. 198/853 |
| 6,695,128 | B2 | 2/2004 | Palmaer et al. | |
| 6,796,418 | B1 | 9/2004 | Harrison et al. | |
| 6,837,367 | B1 | 1/2005 | Klein et al. | |
| 2001/0050214 | A1 * | 12/2001 | Guldenfels | .................. 198/853 |

* cited by examiner

*Primary Examiner*—James R Bidwell
(74) *Attorney, Agent, or Firm*—Thomas M. Freiburger (57) ABSTRACT

A modular plastic conveyor belt, formed of successive rows of assembled injection molded modules connected by laterally-extending pins, has arched tops in each module row and increased depth in the laterally-extending spine of the belt. The belt structure enables the modular plastic belt to be retrofitted in a spiral system normally carrying a steel conveyor belt. In one embodiment the arched-top module rows, having a greater depth than normal, are accommodated on a small-diameter roller, by forming a generally cylindrical undercut at the bottom of each module row, reducing the distance of protrusion outwardly from the roller. The arched-top configuration lends itself not only to transfer of articles as the conveyor passes over the sprocket for a roller, but also the provision of increased beam depth at the center of the module, with lower profiles at the extremities of the link ends.

12 Claims, 9 Drawing Sheets

FIG. 1

PRIOR ART

MODULAR PLASTIC CONVEYOR BELT FOR SPIRAL CONVERSION

BACKGROUND OF THE INVENTION

This invention encompasses a conversion for spiral conveyor belt systems, by which a modular plastic conveyor belt is fitted onto a spiral tower designed for carrying a steel spiral conveyor.

Spiral conveyors have experienced increasing use in past decades particularly in the food industry, and they are also finding more and more uses in other manufacturing operations. They enable dwell time on a spiral tower in what is technically a helical path, the conveyor belt being driven up the curving incline in a low tension arrangement, primarily by engagement with a rotating driving tower at the center. Spiral conveyors initially, and for many years, comprised all steel belts, usually stainless steel for the food industry.

However, with the advent of plastic modular conveyor belts, capable of assembly in any length and virtually any width, some spiral conveyor belt systems were fabricated from modular plastic conveyor belts. Plastic materials have been developed for withstanding wide ranges of temperature, including high temperatures used in baking and other food processes and below-freezing temperatures, and spiral conveyors have been used for providing dwell times in desired environments, for cooling loaves of bread, for example, or for processing foods in other ways requiring an elevated-temperature environment. As examples of patents covering modular plastic conveyor belt systems, see KVP U.S. Pat. Nos. 4,901,844, 5,069,330, 5,310,045, 6,484,379 and 6,796,418.

A great many industries using steel spiral conveyor belt systems now desire to convert to modular plastic spiral conveyor systems. The plastic conveyor belts are not susceptible to corrosion, tend to be more easily cleanable and generally have smoother surfaces. Also, they have a lower coefficient of friction than steel, are lighter in weight and are more energy efficient due to the lower friction and lighter weight. They are easier to replace and repair, and most foods do not stick to plastic as they do to steel. In addition, steel belts as they wear tend to produce metal grindings, small particles of metal that can drop into the goods conveyed, which may be food products. This is unacceptable. However, the steel belts are not easily replaced with plastic because steel belts are generally stronger in beam strength through their width, and a typical track for a steel spiral conveyor has only two rails, or those for wider belts. If a plastic modular conveyor belt were fitted onto such a track with rails spaced apart as in a steel spiral system throughout the spiral path, a typical plastic modular conveyor belt would not support anything but a fairly light load on such a belt. In one solution to this problem, KVP in the above-referenced U.S. Pat. No. 6,796,418, in its SPIRAIL system, provides an easily installed retrofit kit for adding one or more additional rails to a spiral support track, thus enabling the use of plastic modular radius-type conveyors (such as those made by KVP) in a spiral system to support reasonably heavy loads.

See also U.S. Pat. No. 6,837,367, which shows a plastic modular belt for replacement of a steel belt in a spiral system. In that patented belt the center spine is enhanced in strength in the central region of the belt's width by being thicker (front to back) at that region than at both side edges.

It is an object of the current invention to provide a plastic modular conveyor belt which in itself has significantly increased beam strength to span between spaced apart rails such as typical of a steel spiral conveyor system, without the need for additional support rails, and at the same time to provide for smooth transfer of articles on and off the belt.

SUMMARY OF THE INVENTION

In the current invention, a modular plastic conveyor belt, formed of successive rows of assembled injection molded modules connected by laterally-extending pins, has arched tops in each module row and increased depth in the laterally-extending spine of the belt. The belt structure enables the modular plastic belt to be retrofitted in a spiral system normally carrying a steel conveyor belt, although it can also replace a plastic spiral belt or be installed on new equipment. In one embodiment the arched-top module rows, having a greater module depth than normal, are accommodated on a small-diameter roller, by forming a generally cylindrical undercut at the bottom of each module row, reducing the distance of protrusion outwardly from the roller. For example, a 2½ inch pitch belt can be used on a roller designed for a 2 inch pitch belt (typical of some steel spiral systems) through the accommodation made by the arcuate undercut at the bottom of each module, and the belt can travel around a six-inch roller just as smoothly as will the smaller-pitched belt.

The arched-top configuration lends itself not only to transfer of articles as the conveyor passes over the sprocket for a roller, but also the provision of increased beam depth at the center of the module for increased spanning strength, with lower profiles at the extremities of the link ends. When the arched-top belt passes over sprockets or over a roller, changing the plane of travel, chordal action, i.e. radially outward protrusion of the belt knuckles as the belt passes over the sprocket, is substantially eliminated.

Thus, with a spiral conveyor belt made up of arched-top modules as in the invention, a plastic belt can be used in place of a steel belt on a spiral system that has only two rails spaced widely apart. The arched (curved) tops increase the beam strength at the center of each module row to the point that a given load can be carried on the spiral system, spanning between two support rails, whereas a similar plastic belt with a flat top surface, with the center spine height no larger than the link ends, would fail or would deeply sag under that given load, thus would be incapable of carrying the defined load. The high center spine provided by the arched configuration gives the belt such greatly increased beam strength that it can substitute for a steel belt for which the spiral system was designed, in nearly all situations. The belt and the belt conversion of the invention enable a plastic belt to travel through the same relatively tight curve radius around the spiral tower, while still being able to carry a relatively heavy load of conveyed goods while spanning between the spaced apart rail supports, and while still providing a large open area for airflow through the belt via the minimum supporting rail area. Cost and inconvenience of converting a steel spiral system to plastic are greatly reduced, with no need to re-engineer, add further support rails, etc.

In spiral conveyors handling food products, about 80% of the spirals currently installed are used for panned or packaged product, which are efficiently conveyed on the arched tops, and the arched tops provide for minimum contact with the belt for increased cooling due to more air flow around the product. The balance of spiral conveyors directly contact the food products; the belt of the invention works well with foods of large enough size.

For accommodating a tight turn radius for curves in one direction, the module rows in the belt of the invention preferably have a reduced thickness in the spine on the inner side of the curve, i.e. less thickness from front to back of the spine, allowing a greater degree of collapse at the inner side. The spine at the outer side preferably is not of reduced thickness. Another feature is that the link ends, which are alternatingly interdigited from one module row to the next, preferably have rod-supporting lateral projections that circumscribe only part of the rod and which overlap in position between link ends of one module row and interdigited link ends of another module row. These provide a greater width of engagement against the rod for placing the pressure of the belt tension against the rod over a wider area, thus reducing bending moment on the rod and increasing the tension that can be withstood by the rod without deflection or failure.

Another feature in a preferred form of the invention is that the link ends at the edges of the plastic spiral conveyor belt are not arched but are flat at the top, and those link ends may also be much heavier link ends, particularly at the outside of the curve, to accept the tension of the belt. The flat configuration at the edge enables the edge modules to be engaged with hold-downs which form part of the belt track.

It is thus among the objects of this invention to enable an efficient, convenient and economical conversion of a steel spiral conveyor system to a plastic modular conveyor belt, while also providing for increased air flow, smooth transfer of items onto and off the plastic belt, and efficient cleaning by scraping the belt while it forms a cylindrical surface over a roller. These and other objects, advantages and features of the invention will be apparent from the following description of a preferred embodiment, considered along with the accompanying drawings.

DESCRIPTION OF PREFERRED EMBODIMENTS

Figure 1:
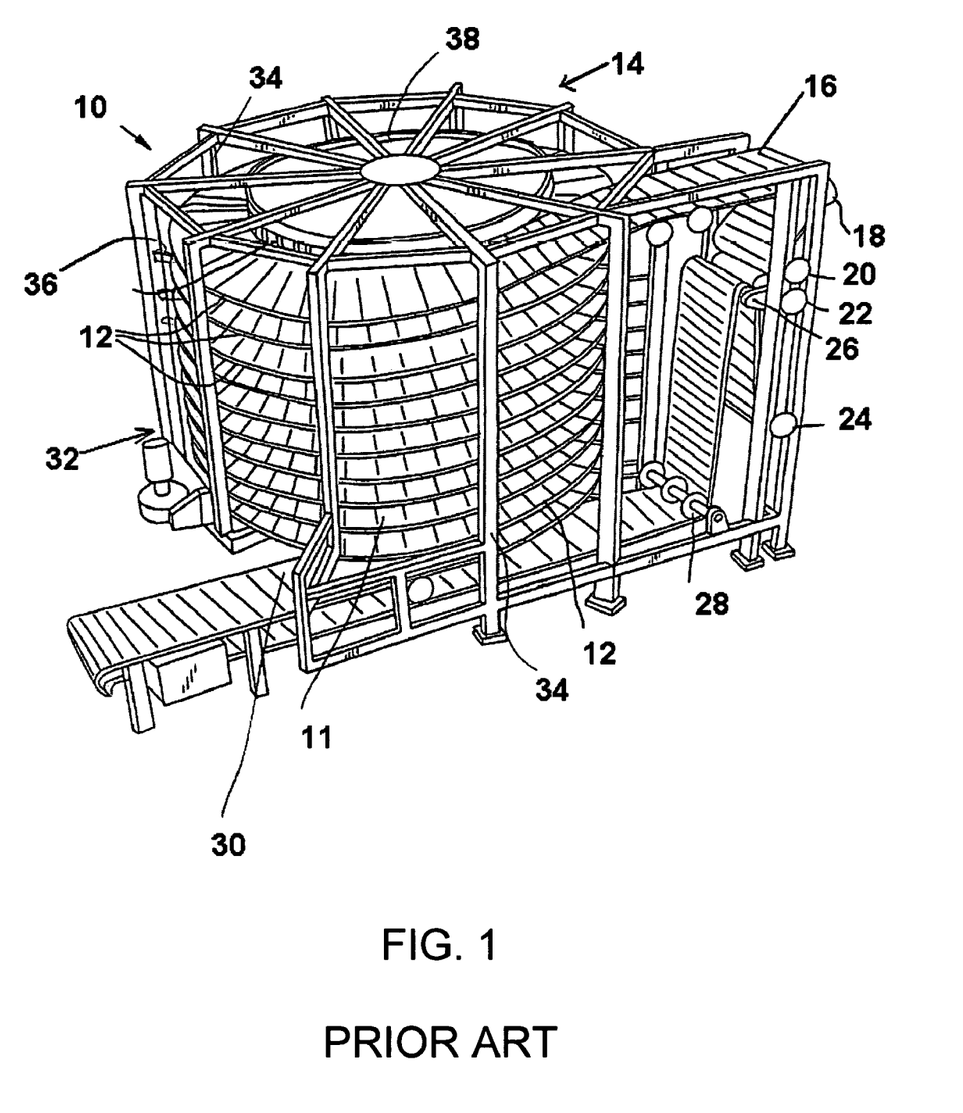
FIG. 1 is a view showing a typical spiral conveyor belt system.

In the drawings, the perspective view of FIG. 1 schematically illustrates a spiral conveyor system 10 in which a conveyor belt 11 travels in a helical path through a series of tiers 12 in a driving tower 14. The conveyor 12 normally rises through the helix defined by the driving tower, exits off the upper end of the tower at 16 and passes over a series of rollers 18, 20, 22, 24, 26, 28, etc. as schematically shown in the drawing, ultimately to be fed back into the bottom of the helical path of the conveyor tower at 30.

As is well known, a spiral conveyor system normally has a support frame 32 which includes a series of columns 34 around the circumference of the conveyor belt, and these have inwardly-extending cantilevered beams or bars 36, some of which are indicated in the schematic view of FIG. 1. These, in the typical steel spiral conveyor belt system, support two or sometimes three tracks that follow the helical path to support the width of the belt 11. These tracks (not seen in FIG. 1) are spaced apart and in the case of two tracks, for example, most of the width of the belt must span between them, the steel belt having considerable beam strength for this purpose. A driving cage 38 is seen in the drawing, located centrally within the frame 14, for frictionally engaging the inner sides of the spiral conveyor belt 11 to drive the belt in its helical path through the system. In many systems the belt is also driven a series of driving sprockets outside the helical path, in the portion between the exit at 16 and the re-entry to the helix at 30.

Figure 2:
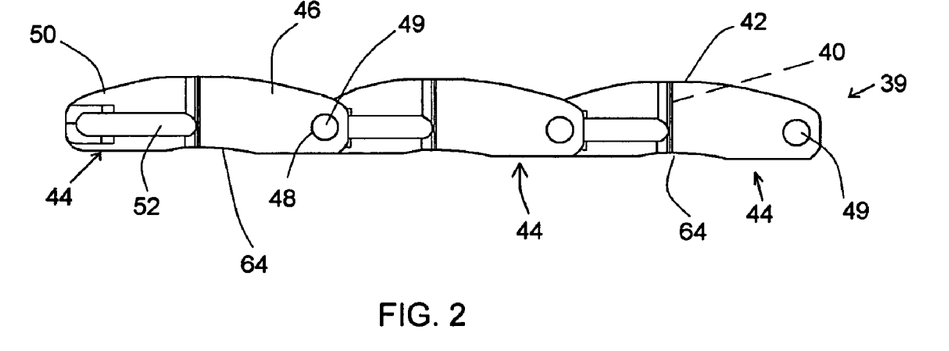
FIG. 2 is a side elevation view showing a portion of a conveyor belt of the invention.
Figure 3:
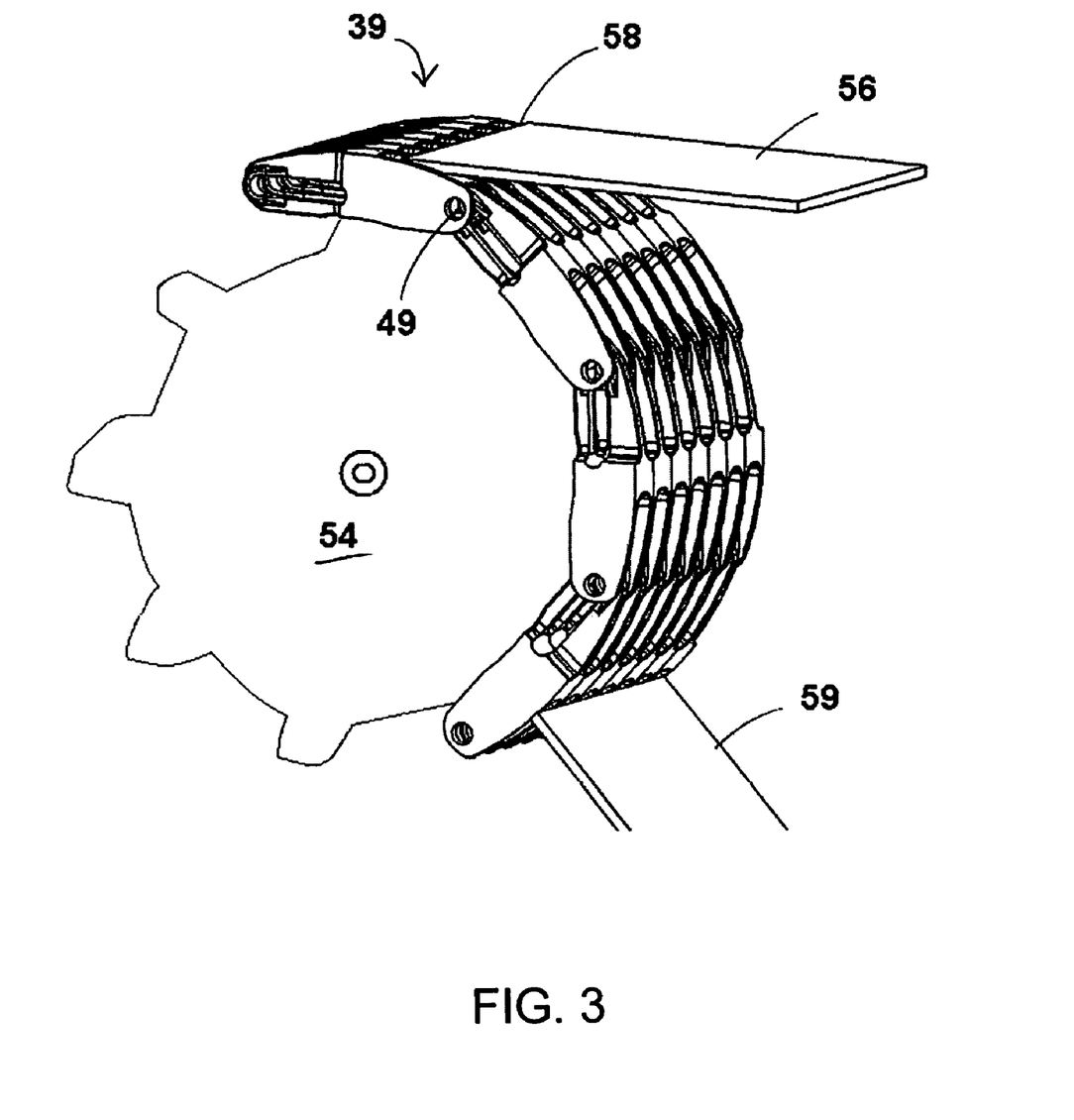
FIG. 3 is a perspective view showing the use of a conveyor made up of arched top plastic modules for transfer of articles.
Figure 4:
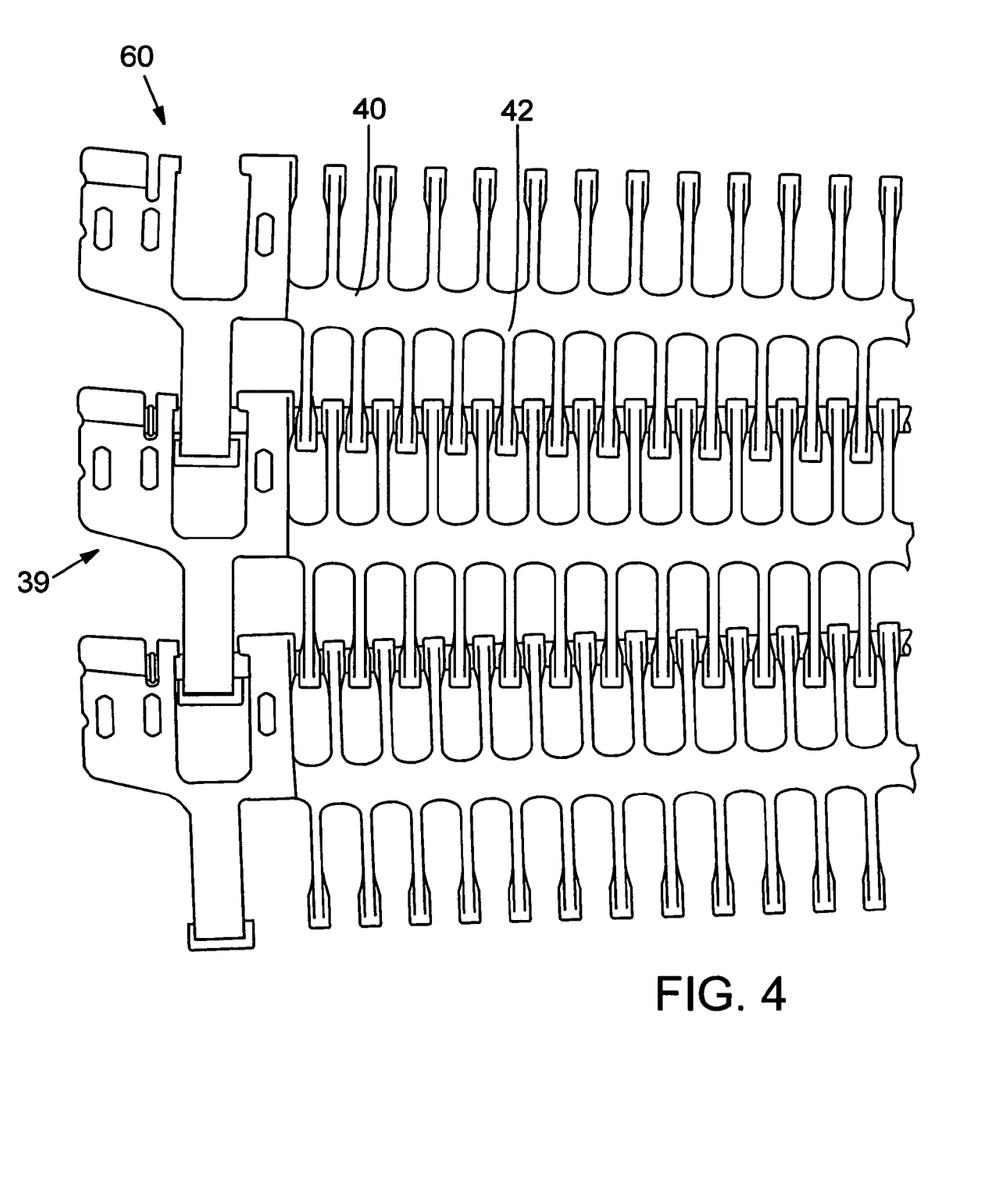
FIG. 4 is a plan view showing a portion of the belt of the invention in a curve configuration.

FIGS. 2 through 4 show an arched-top or curved-top conveyor belt 39, of the general type as shown in KVP U.S. Pat. No. 5,613,597. This is an arched-top radius conveyor belt, for travel around curves or in straight travel, such as, for example, KVP No. IS6200 with curved top (2 inch pitch) or a similar belt with 2½ inch pitch. A 2½ inch pitch belt may be used for replacement of a typical 2 inch pitch steel belt (or these pitches can be larger or smaller). From the side elevation or section view of FIG. 2, as well as FIG. 5, it can be seen that a central spine 40 of the belt is taller than the remainder of the belt, because of the curved or arched top 42, with the spine 40 being located substantially at the highest, deepest point in the belt. FIG. 2 shows a portion of the conveyor belt 39, illustrating three rows of modules, each module row generally identified as 44. Each module has link ends extending in both directions, including link ends 46 preferably with circular apertures 48 extending in one direction and opposing link ends 50 extending in the opposite direction and having slotted apertures 52, as are well known in modular plastic conveyor belts for allowing travel through curves. Connecting rods are shown at 49. In curving travel the inner side of the belt collapses closely together while the outer side of the belt in the curve remains fully extended, and in fact accepts essentially all tension in the belt.

Figure 2A:
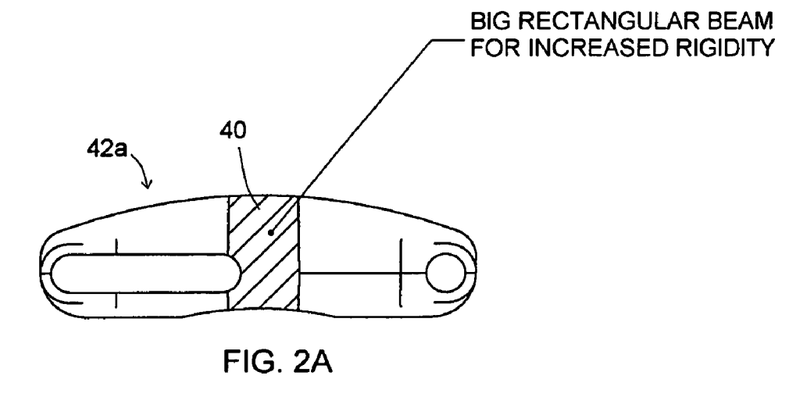

FIG. 2A shows a slightly modified module configuration with the center spine 40 a larger rectangular beam for further increased rigidity.

FIG. 3 shows in perspective a proportion of the width of an arched-top conveyor belt such as the belt 39, with the belt traveling over one or a series of driving sprockets 54. FIG. 3 shows an important function of an arched top conveyor, explained in KVP U.S. Pat. No. 5,613,597, which is incorporated herein by reference. When the arched top conveyor, with the curving tops being at a prescribed radius, travels over a driving sprocket 54, the adjacent module rows pivot on the connecting pins 49 and form essentially a true arc while following the sprocket, defining a portion of a circular cylinder as shown in the drawing. This enables a transfer plate 56, which may have an angled forward edge 58, to be positioned very closely alongside (or in contact with) the cylindrical surface as the belt travels on the sprocket, for effective and seamless transfer articles onto and off the conveyor belt surface. The arched top conveyor, although used for many different products, is especially adaptable for flat-bottomed articles and articles for which minimum contact with the belt is desired, and these types of articles are very efficiently transferred onto or off the belt transfer plate 56. In addition, scraping the belt is efficiently accomplished, to clean residue off the belt. A scraper 59 is shown in contact with the cylindrical surface formed by the belt in FIG. 3.

FIG. 4 shows an arched top radius conveyor belt such as the belt 39 in a curve, with the outside of the curve shown at 60, and from this is it is seen that the module rows collapse together at the inner side of the belt. Again, this may be a 2½ pitch belt.

Figure 5:
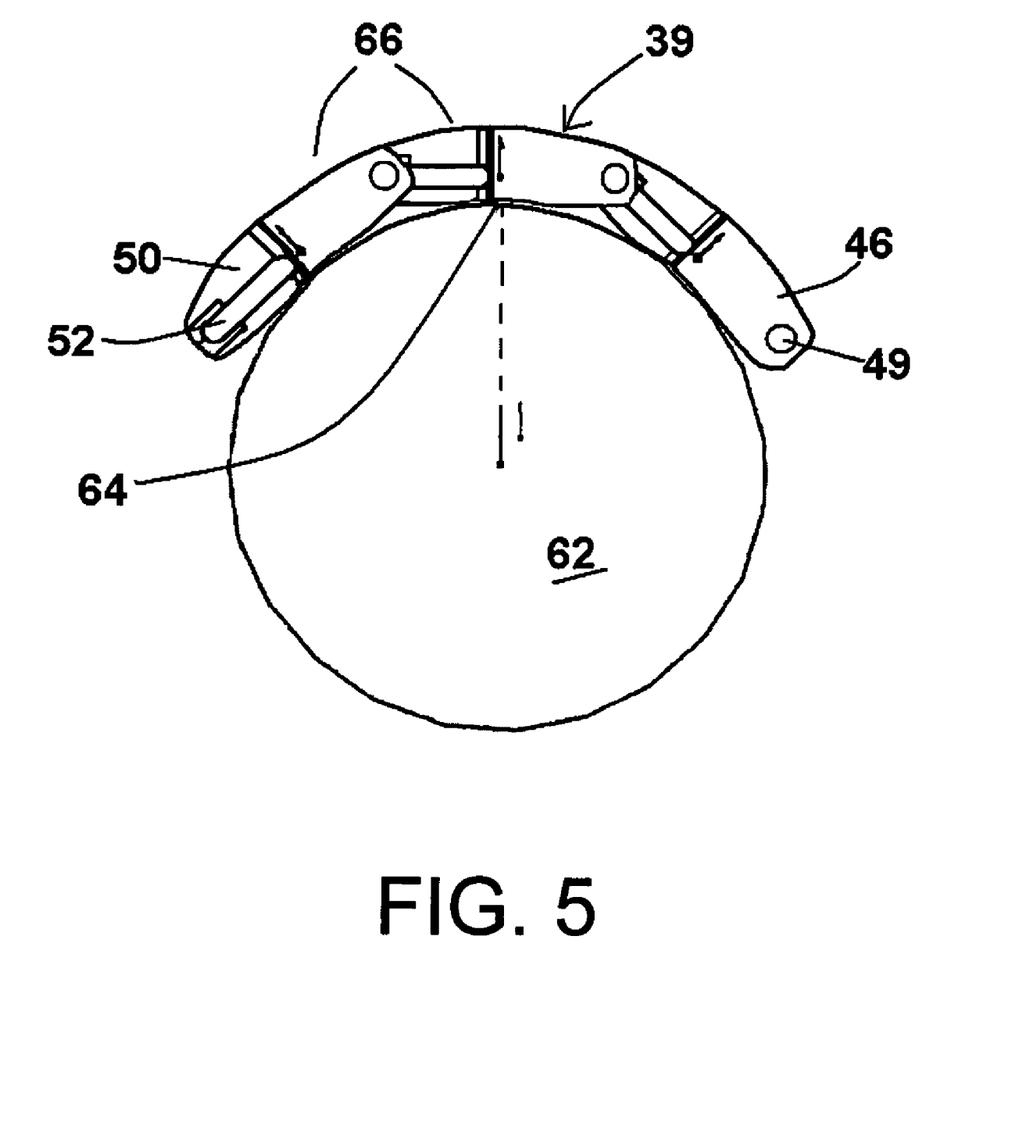
FIG. 5 is a schematic view showing a portion of a belt of the invention passing over a roller for change of belt direction.

FIG. 5 shows a short fragment of the belt 39 traveling over a roller 62 such as is typical in spiral conveyor systems for portions of the belt that are not on the spiral tower, where the belt changes plane of direction. This schematic view illustrates that a larger-pitch modular plastic belt 39 may be used on a roller 62 designed for a smaller-pitched steel belt. For smoother action around the roller 62, the bottom surfaces of the arched-top belt module rows can have arcuate undercuts on a 64, each undercut defining a short arc of a cylinder at the bottom side of the module row. This causes the belt rows to better conform to the roller when passing over the roller and thus smoother action. Another benefit of the undercut is, in the case of a 2½ inch pitch belt on a roller designed for a 2 inch belt (or any similar conversion using a larger-pitch belt as replacement), that the cylindrical outer surface 66 can be maintained as the belt passes over the roller, allowing a transfer plate to be used against this surface if desired. The undercut allows the bigger pitch belt to perform in the place of a smaller pitch belt. Six-inch diameter rollers and sprockets tend to be standard on most spiral conveyors. So, the undercut allows the benefits of a bigger pitched belt, but still fitting in place of and performing similar to a smaller pitch belt. Most spiral conveyors use a scraper to scrape off residue from the top of the belt. This residue can be anything from breading, glaze, marinade, ice or a number of things that would be associated with the product or the process. The arched top surface of the belt and the undercut allow for this belt design to go around the standard six-inch diameter roller or sprocket and to make an almost perfect circle on the outside surface of the belt. This allows for better transfer of the product, but also allows for a scraper to come in contact with almost all of the top surface of the belt, making the belt cleaner and reducing buildup that could reduce airflow or adversely affect the performance of the belt. These benefits outweigh the small loss of beam strength caused by the reduced height at the undercut. The undercut 64 for the roller is also shown in the side view of FIG. 2.

Figure 6:
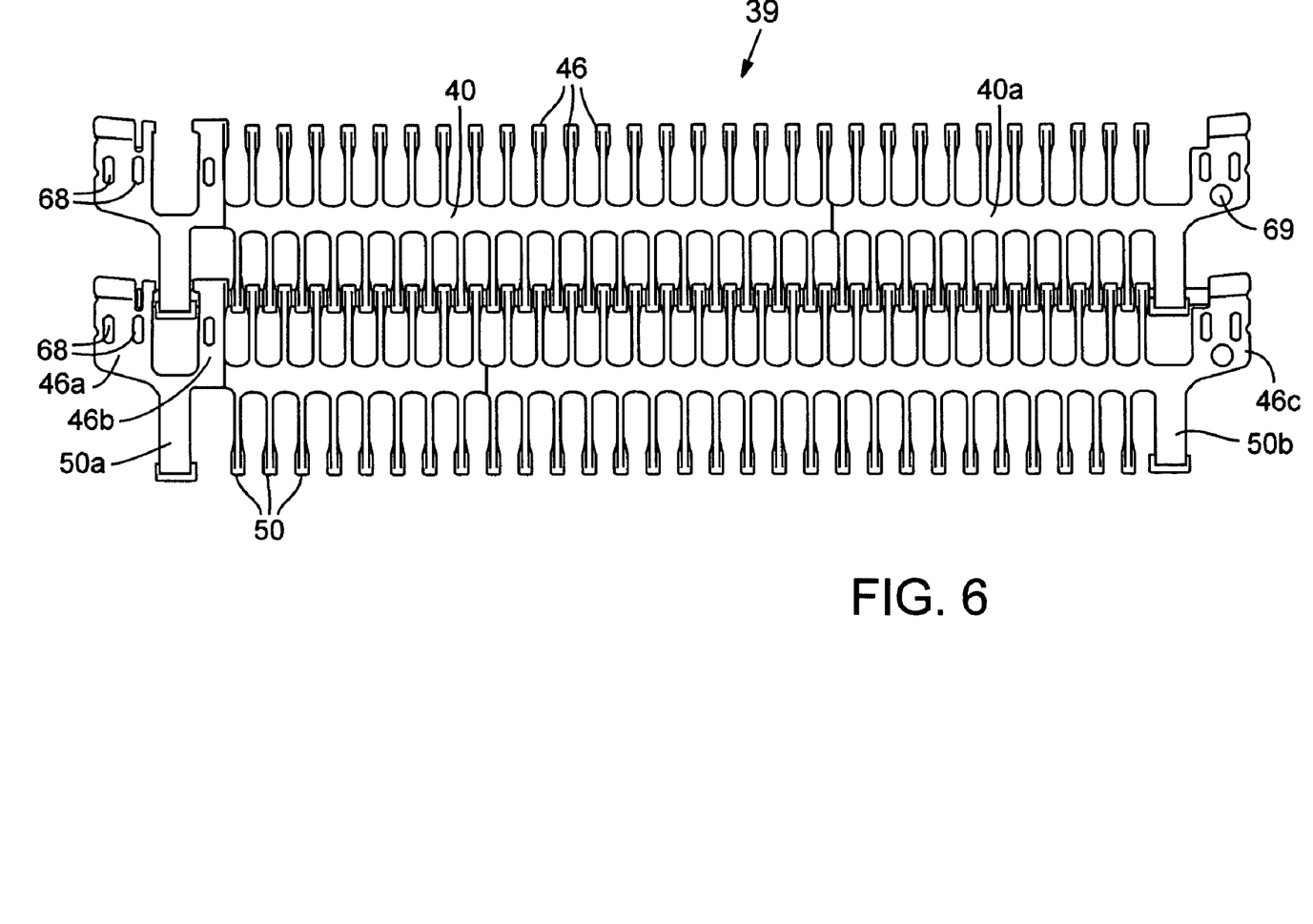
FIG. 6 is a schematic plan view showing a belt of the invention.
Figure 7:
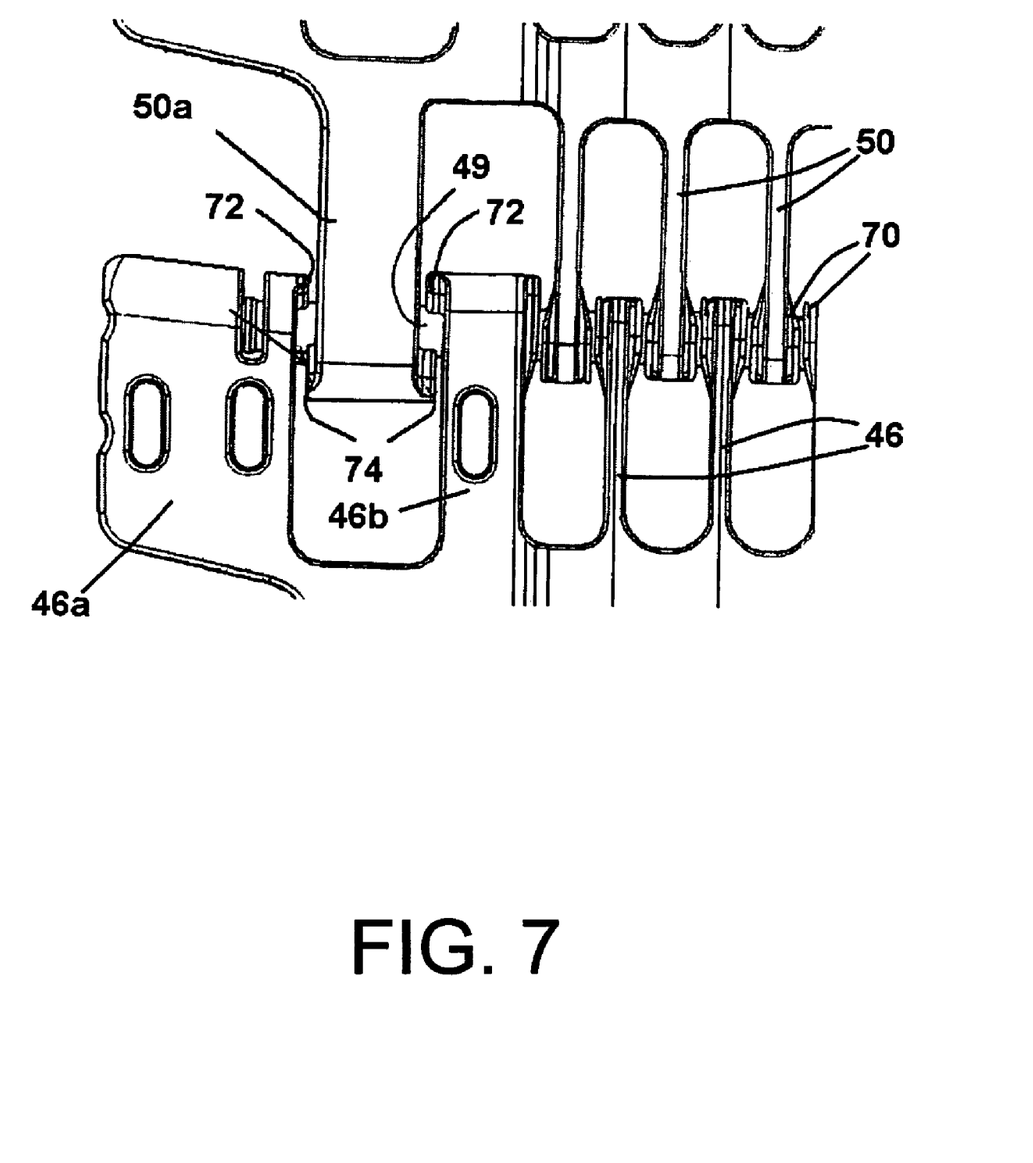
FIG. 7 is an enlarged schematic plan view showing a portion of the belt.

FIGS. 6 and 7 show an example of the current belt 39 in plan view, with FIG. 7 being an enlarged view showing the outer side of the belt where two module rows are connected together. In FIG. 6 the spine 40 is seen as extending in a normal thickness through most of the width of the belt. The spine may be at a lesser width (front to back) at a region 40a of the spine near the inner side of the belt as regards travel on a curve. The spine still retains its height (essentially at the top of the arch) in this region 40a, but the thickness is less so that the belt can collapse more closely together at the inside of the curve, to maintain preferably about a 1.0 to 1.6 turn radius.

FIG. 6 shows a belt 39 which has rows made up of several side by side modules, assembled in a staggered or brick laid configuration. The joints in the rows cause some loss of strength across the belt, made up for in part by the staggering of the seams or joints. The advantage of the multiple-module rows is in the ability to fashion a belt of almost any desired width by use of multiple pieces to make up a row. However, more common belt widths can be molded as single-module rows for added strength. The connecting rod also takes some of the bending moment under load, and the rod size and material can be a factor in the beam strength of a belt.

As shown in both FIGS. 6 and 7, heavier link ends 50a, 46a and 46b are shown at the outer side of the belt, and similarly, heavier inner link ends 50b and 46c are shown at the inner edge of the belt. At the outer edge, these heavier link ends accept nearly all tension in the belt when traveling around a curve. At the inner edge of the belt, the heavy link ends are not under tension as at the outer edge but the stout edge knuckle with a larger area of surface contact with the driving cage will reduce chatter and slippage; also, the inside edge knuckle 46c is the portion of the belt that sees the most lateral force as the belt is being pushed up against the cage or wearstrip. In addition, the size of the inner knuckle 46c provides room to add accessories such as side guards and radius plugs (which limit the degree of collapse at the inner edge). Further, with the inner edge knuckle formed in the same size and design as the outer edge knuckle, this allows for the connecting rod to be inserted and to lock into the inside knuckle, outside knuckle or both. With both the link end or knuckle 46c and the adjoining link end 50b larger than the mid-belt link ends 50, this helps if the belt ever must go into a reverse curve situation in the return path of the belt. A larger knuckle will be able to handle more tension load than a small knuckle. The larger knuckle can also help absorb more shock if the inside edge of the belt becomes snagged on anything.

At both the inner and outer edges of the belt, the edge portions preferably are not arched, but follow the same height from front to back of each module. This accommodates engagement with a hold down guide or slot at the edge of the belt, especially at the outer edge in the spiral, preventing the belt from lifting. The slots 68 seen in the link ends 46a, 46b and 46c are to receive accessories, such as a snap-in side guard. A round hole 69 seen on the link ends 46c is for a radius limit adjustment plug as noted above.

Figure 7A:
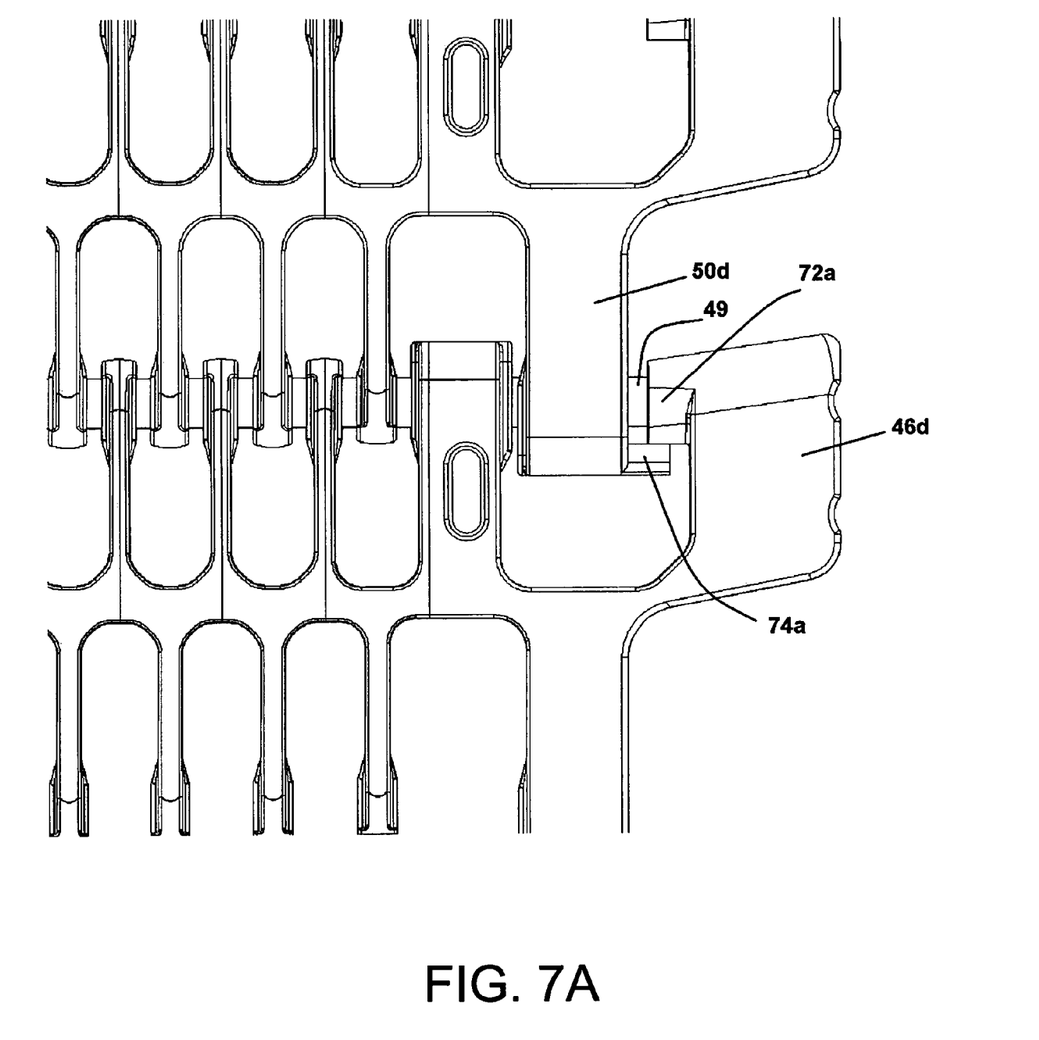
FIG. 7A, similar to FIG. 7, shows a modification.

FIG. 7 shows that the link ends preferably are configured to minimize bending moment on the connecting rod 49 that holds module rows together. In the regular link ends 46 and 50 through nearly all the width of the belt, these link ends have wider ends 70 at the ends of the apertures, for increased strength in withstanding pressure against the connecting rod or pin and also for minimizing space where the connecting rod would be exposed between link ends. At the heavier edge link ends 50a, 46a and 46b, these link ends have special rod-supporting lateral projections 72 and 74 as illustrated. The special projections 72, 74 circumscribe only part of the rod, which may be about 90° of the rod, and they overlap in position between link ends of one module row and the interdigited link ends of the adjacent module row, as can be seen in FIG. 7. This provides a greater width of engagement against the rod, spreading the pressure of belt tension against the rod over a wider area and reducing or effectively eliminating the gap between knuckles by which unsupported portions of the rod would be subject to bending. The illustrated structure reduces bending moment on the rod between the link ends pulling in opposite directions in this outer edge region of the belt. On the knuckles 46a and b and 50a the protrusions 72 and 74 preferably actually overlap each other and support the rod without a rod gap between them. This prevents the rod from bending and changes how the tension force is applied. The tension force no longer is applied in a manner which tends to bend the rod; the rod is now subjected to shear forces and compression between the projections 72 and 74 on its opposite sides, making the connection stronger and enhancing failure resistance and yield resistance. In this way the current design does not simply depend on bending resistance or shear strength of the rod, but the effective strength of the rod is enhanced by the knuckles themselves. A further extrapolation of this design can be one in which modified protrusions 72 and 74 actually contact and lock together each other when the belt is in tension, transmitting the tension load more to the link ends directly and less of this force to the rod. This is shown in FIG. 7A, where a modified heavier link end 50d has a lateral projection 74a that actually engages with and locks onto an enlarged lateral projection 72a of the adjacent heavy edge link end 46d of the adjacent module row. Here the lateral projection 72a circumscribes the rod 49 or at least extends across the side of the rod facing the opposing projection 72a. This can be configured to take away some or all of the force on the rod at this point at the edge of the belt. The engagement between lateral projections could occur on both sides of the link and rod if desired.

Figure 8:
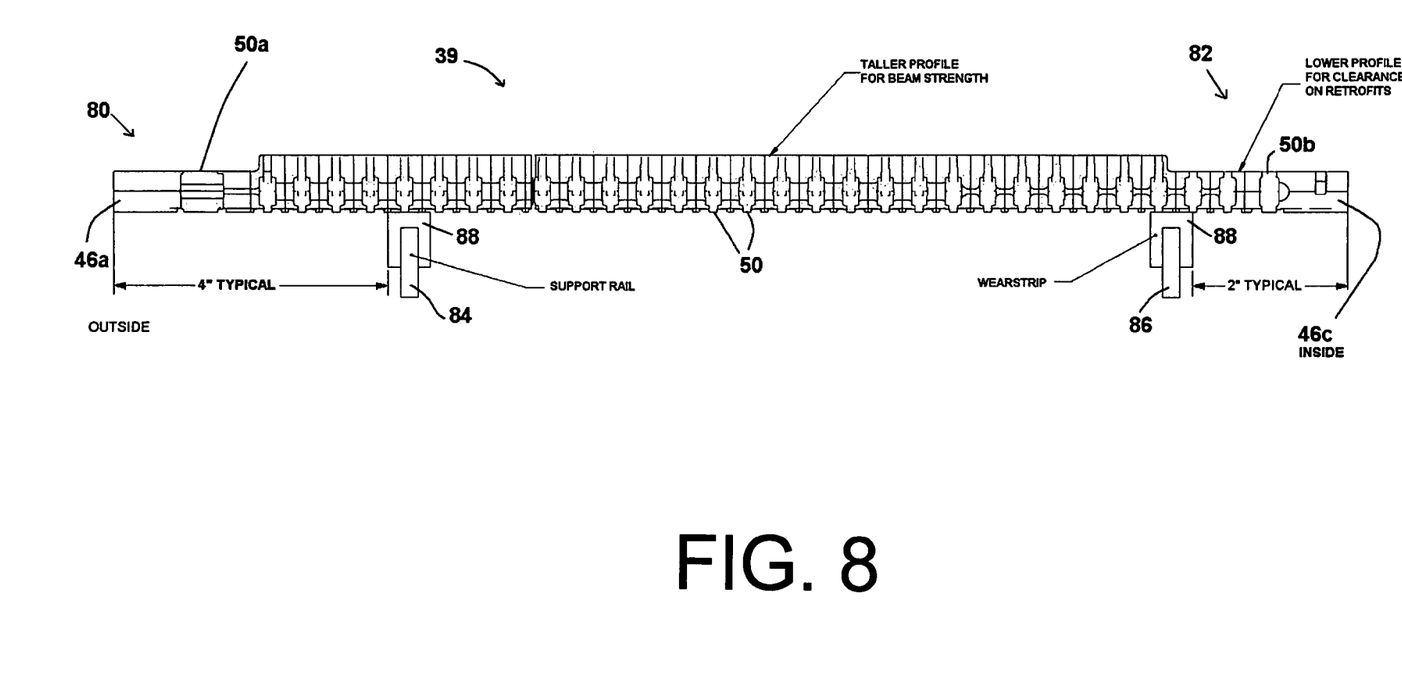
FIG. 8 is an elevation view in transverse cross section, showing the belt modules of the conveyor with flat end portions, in one embodiment.

FIG. 8 is a longitudinal sectional view illustrating the lower, non-arched edges of the belt 39. The lower profiled edges are indicated generally at 80 and 82 for the outer and inner edges of the belt 39, respectively. These outer and inner edges are, of course, made up of the edge components shown in FIGS. 4, 6 and 7, as indicated. In this view support rails are also shown at 84 and 86, in positions which might be expected in a conversion situation from a steel spiral belt. Each support rail carries a wearstrip 88 against which the belt rests, as is typical. The positions of the support rails can be, for example, about two inches from the inner edge of the belt and about four inches from the outer edge of the belt, for a belt in a width range of about 12 inches to about 60 inches (most are about 24 inches to about 42 inches). The lower profile edges allow for clearance on retrofits, especially for any guide strips that hold the belt down. For example, the lower edge height at both outside and inside edges as shown in FIG. 8 can be about 0.72 times the maximum height at arches (more broadly about 0.6 to 0.8 times maximum height). One example of maximum and edge heights is about 0.83 inch and about 0.60 inch. The tips of link ends in the majority of the belt module can be about at the edge height (e.g. 0.6 inch).

An example of a spiral conveyor belt conversion, from steel to a modular plastic conveyor in accordance with the principles of the invention, is as follows:

The plastic conveyor belt described above can be used to replace either steel belts or plastic belts. An example of a steel belt spiral system might have two supporting rails for belts up to 36" in width, and three rails for belts up to 54" in width. Strength requirements for spanning between these rails always depends on the type of product, product load weight and distribution. The plastic modular belt of the invention can replace steel belts in nearly all spiral configurations of this general type.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

We claim:

1. A modular, molded plastic conveyor belt of the type made up of a multiplicity molded plastic modules connected together in successive rows by connecting pins or rods extending through interdigited link ends of the adjacent module rows, each of the modules having a center spine running laterally of the belt and a series of said link ends extending in fore and aft rows from the spine, and the conveyor belt being a spiral conveyor supported by spaced apart rails below the belt, and the belt carrying a defined load, the belt comprising:

each module and module row having an arched top, forming a generally partial-cylindrical surface which is lower at the ends of link ends where the module rows are connected by the connecting pins and higher at a position generally central between adjacent connecting pins essentially where the center spine is located, the center spine being continuous through at least most of the width of the belt and the height of the spine being sufficient, with the belt carrying the load, to provide sufficient beam strength to span between the spaced apart supporting rails, and wherein the conveyor belt, if its center height were reduced to the height of the ends of the link ends, would be incapable of carrying the defined load when spanning between the spaced apart rails.

2. A modular, molded plastic conveyor belt according to claim 1, wherein each belt module row has left and right edges which are not arched and which are of lower profile than the arched top in the modules.

3. A modular, molded plastic conveyor belt according to claim 1, wherein each module row includes an arcuate undercut at its bottom side, to enable smooth travel over a roller of prescribed diameter.

4. A modular, molded plastic conveyor belt according to claim 1, wherein the belt has an inner side, positioned on the inside relative to a spiral conveyor tower, and wherein at the inner side of each belt module row the spine is of reduced thickness from front to back, to accommodate greater collapse of the module rows together at the inner edge in a curving path of the spiral conveyor.

5. A modular, molded plastic conveyor belt according to claim 1, wherein the spiral conveyor has rollers over which the belt travels when outside a spiral conveyor tower, to change the belt from one plane of travel to a different plane of travel, and wherein the belt is of about 2½ inch pitch and the rollers are designed for a belt of about 2 inch pitch, each module row including an arcuate undercut at the bottom side of the modules, on an undercut axis parallel to the connecting pins, for contact with the rollers so that the rollers can smoothly accommodate the 2½ inch pitch belt.

6. A modular, molded plastic conveyor belt according to claim 1, including a transfer plate for transfer of products to or from the belt at a portion of the belt where the belt does not travel in a spiral, the transfer plate being directly adjacent to the belt as the belt passes over a row of sprockets with the arched tops of the module rows forming a substantially continuous partial-cylindrical surface to which the transfer plate lies directly adjacent.

7. A modular, molded plastic conveyor belt according to claim 1, wherein each belt module row has special, heavier link ends at least at the outer side of the belt relative to curving travel of the belt, and wherein the special link ends include lateral projections at tips of the link ends partially circumscribing the connecting pin which connects interdigited special link ends from module row to module row, the lateral projections overlapping in position along the connecting pin so as to reduce bending moment on the connecting pin under high tension existing at the outside of a curve.

8. A modular, molded plastic conveyor belt according to claim 1, wherein each belt module row has special, heavier link ends at least at the outer side of the belt relative to curving travel of the belt, and wherein the special link ends include lateral projections at tips of the link ends at least partially circumscribing the connecting pin which connects interdigited special link ends from module row to module row, the lateral projections overlapping in position along the connecting pin and being engaged in contact from one module row to the adjacent module row so that the special link ends of adjacent module rows accept some of the tension force at the outside of a curve in travel of the belt, removing at least some of the force from the connecting pin.

9. A method for converting a spiral conveyor belt system having a steel conveyor belt to a plastic modular conveyor belt, the spiral system having a spiral tower with spaced apart support rails positioned widely apart to support a steel belt as it travels through the spiral or helix of the spiral conveyor belt system, the method comprising:

removing the steel belt from the spiral conveyor belt system, replacing the steel belt with a modular plastic conveyor belt, the belt being in a series of connected module rows each having, at least through most of its width, an arched top, forming a generally partial-cylindrical surface which is lower at the ends of link ends where the module rows are connected by connecting pins and higher at a position generally central between adjacent connecting pins essentially where a center spine of the module row is located, the center spine being continuous through at least most of the width of the belt and the spine acting as a lateral beam in each module row, with the height of the spine being sufficient, with the belt carrying a defined load, to provide sufficient beam strength to span between the spaced apart supporting rails.

10. The method of claim 9, wherein the steel belt of the spiral conveyor belt system, prior to the conversion, has a pitch of about 2 inches, and wherein the plastic modular conveyor belt has a pitch of about 2½ inches.

11. The method of claim 9, wherein the arched top modular plastic conveyor belt has a pitch of about 2½ inches, a height at the ends of link ends of about 0.5 to 0.6 inch, and a maximum height at the center of the arch of about 0.83 inches and wherein the spacing between rails, from center to center of the rails, is about 12 to 14 inches.

12. The method of claim 9, wherein the arched top modular plastic conveyor belt has a pitch in the range of about 1 to 3 inches.

* * * * *